United States Patent
Brakob et al.

(10) Patent No.: US 11,087,103 B2
(45) Date of Patent: Aug. 10, 2021

(54) ADAPTIVE SPATIAL GRANULARITY BASED ON SYSTEM PERFORMANCE

(71) Applicant: Target Brands, Inc., Minneapolis, MN (US)

(72) Inventors: Christopher Mark Brakob, Maple Grove, MN (US); Todd Hagen, Shakopee, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 16/872,963

(22) Filed: May 12, 2020

(65) Prior Publication Data

US 2021/0004549 A1     Jan. 7, 2021

Related U.S. Application Data

(60) Provisional application No. 62/869,802, filed on Jul. 2, 2019.

(51) Int. Cl.
*G06K 7/10*          (2006.01)
*G06Q 10/08*     (2012.01)

(52) U.S. Cl.
CPC ....... *G06K 7/10475* (2013.01); *G06Q 10/087* (2013.01)

(58) Field of Classification Search
CPC .................... G06Q 10/087; G06Q 10/0875
USPC ............................ 235/385, 375, 487; 705/28
See application file for complete search history.

(56) References Cited

U.S. PATENT DOCUMENTS

| | | |
|---|---|---|
| 5,465,115 A | 11/1995 | Conrad et al. |
| 5,973,732 A | 10/1999 | Guthrie |
| 6,556,878 B1 | 4/2003 | Fielding |
| 7,246,044 B2 | 7/2007 | Imamura et al. |
| 7,330,856 B2 | 2/2008 | Nicastro et al. |
| 7,359,836 B2 | 4/2008 | Wren et al. |
| 7,382,267 B2 | 6/2008 | Brendley et al. |
| 7,567,844 B2 | 7/2009 | Thomas et al. |
| 7,620,528 B2 | 11/2009 | Kato et al. |
| 7,664,574 B2 | 2/2010 | Imhof et al. |
| 7,686,217 B2 | 3/2010 | Heckel et al. |
| 7,930,204 B1 | 4/2011 | Sharma et al. |
| 7,994,902 B2 | 8/2011 | Avery et al. |

(Continued)

FOREIGN PATENT DOCUMENTS

| | | |
|---|---|---|
| WO | 2012024516 A2 | 2/2012 |
| WO | 2014113882 A1 | 7/2014 |

(Continued)

OTHER PUBLICATIONS

Anisi et al., An overview of data routing approaches for wireless sensor networks, Sensors, vol. 12, pp. 3964-3996, 2012.

(Continued)

*Primary Examiner* — Edwyn Labaze
(74) *Attorney, Agent, or Firm* — Theodore M. Magee; Westman, Champlin & Koehler, P.A.

(57) ABSTRACT

A method includes monitoring performance of a system that determines locations of items in a retail store based on sensor values from a collection of sensors in the retail store. When the performance is insufficient to process the sensor values as the sensor values are received, a spatial resolution used to determine the locations of the items in the retail store is reduced.

19 Claims, 7 Drawing Sheets

(56) References Cited

U.S. PATENT DOCUMENTS

| | | | |
|---|---|---|---|
| 7,996,281 | B2 | 8/2011 | Alvarez et al. |
| 8,009,863 | B1 | 8/2011 | Sharma et al. |
| 8,185,121 | B2 | 5/2012 | Vangati |
| 8,239,277 | B2 | 8/2012 | Lee et al. |
| 8,310,542 | B2 | 11/2012 | Girgensohn et al. |
| 8,321,561 | B2 | 11/2012 | Fujita et al. |
| 8,385,943 | B1 | 2/2013 | Han et al. |
| 8,577,381 | B2 | 11/2013 | Kalika et al. |
| 8,615,254 | B2 | 12/2013 | Jamtgaard et al. |
| 8,665,784 | B2 | 3/2014 | Kang et al. |
| 8,712,686 | B2 | 4/2014 | Bandyopadhyay et al. |
| 8,838,376 | B2 | 9/2014 | Garin et al. |
| 8,977,521 | B2 | 3/2015 | Angevine et al. |
| 9,076,149 | B2 | 7/2015 | Sorensen et al. |
| 9,077,343 | B2 | 7/2015 | Gong et al. |
| 9,161,175 | B1 | 10/2015 | Smith et al. |
| 9,173,067 | B2 | 10/2015 | Aggarwal et al. |
| 9,225,793 | B2 | 12/2015 | Dutta et al. |
| 9,310,807 | B2 | 4/2016 | Lee et al. |
| 9,319,834 | B2 | 4/2016 | Pierce, II et al. |
| 9,342,928 | B2 | 5/2016 | Rasane et al. |
| 9,389,681 | B2 | 7/2016 | Sankar et al. |
| 9,460,442 | B2 | 10/2016 | Fonzi et al. |
| 9,467,965 | B2 | 10/2016 | Liu et al. |
| 9,489,745 | B1 | 11/2016 | Heitz, III et al. |
| 9,513,127 | B2 | 12/2016 | Goldman et al. |
| 9,515,769 | B2 | 12/2016 | DiStasio |
| 9,532,172 | B1 | 12/2016 | Gerken, III et al. |
| 9,664,510 | B2 | 5/2017 | Nathan et al. |
| 9,691,240 | B2 | 6/2017 | Bradford |
| 9,730,232 | B2 | 8/2017 | Naqvi |
| 9,733,091 | B2 | 8/2017 | Kordari et al. |
| 9,734,388 | B2 | 8/2017 | Marcheselli et al. |
| 9,893,808 | B2 | 2/2018 | Olsen et al. |
| 9,911,290 | B1 | 3/2018 | Zalewski et al. |
| 9,922,367 | B2 | 3/2018 | Reid et al. |
| 2004/0054511 | A1 | 3/2004 | Turner et al. |
| 2006/0237532 | A1 | 10/2006 | Scott-Leikach et al. |
| 2006/0265664 | A1 | 11/2006 | Simons et al. |
| 2008/0059220 | A1 | 3/2008 | Roth et al. |
| 2008/0294487 | A1 | 11/2008 | Nasser |
| 2011/0029997 | A1 | 2/2011 | Wolinsky |
| 2011/0047005 | A1 | 2/2011 | Scanlan |
| 2012/0059729 | A1 | 3/2012 | Roa et al. |
| 2012/0066168 | A1 | 3/2012 | Fadell et al. |
| 2012/0182172 | A1 | 7/2012 | Sorensen |
| 2013/0203436 | A1 | 8/2013 | Hohteri et al. |
| 2013/0304536 | A1 | 11/2013 | Hamachi |
| 2014/0019201 | A1 | 1/2014 | Appel et al. |
| 2014/0237076 | A1 | 8/2014 | Goldman et al. |
| 2014/0244207 | A1 | 8/2014 | Hicks |
| 2014/0278742 | A1 | 9/2014 | MacMillan et al. |
| 2014/0279294 | A1 | 9/2014 | Field-Darragh et al. |
| 2014/0324527 | A1 | 10/2014 | Kulkarni et al. |
| 2014/0324615 | A1 | 10/2014 | Kulkarni et al. |
| 2014/0335893 | A1 | 11/2014 | Ronen |
| 2014/0348384 | A1 | 11/2014 | Kolehmainen |
| 2014/0363059 | A1 | 12/2014 | Hurewitz |
| 2014/0365273 | A1 | 12/2014 | Hurewitz |
| 2015/0235161 | A1 | 8/2015 | Azar et al. |
| 2015/0278829 | A1 | 10/2015 | Lu et al. |
| 2015/0347455 | A1 | 12/2015 | Stanger et al. |
| 2016/0063511 | A1 | 3/2016 | Ben-Eliezer et al. |
| 2016/0071155 | A1 | 3/2016 | Haiges et al. |
| 2016/0110591 | A1 | 4/2016 | Smith et al. |
| 2016/0132910 | A1 | 5/2016 | Appel et al. |
| 2016/0205513 | A1 | 7/2016 | Choudhry |
| 2016/0269418 | A1 | 9/2016 | Sangary et al. |
| 2016/0275534 | A1 | 9/2016 | Iwai |
| 2016/0342905 | A1 | 11/2016 | Ghose et al. |
| 2016/0342929 | A1 | 11/2016 | Tanaka et al. |
| 2016/0342937 | A1 | 11/2016 | Kerrick |
| 2017/0046771 | A1 | 2/2017 | Cropp, Jr. |
| 2017/0127241 | A1 | 5/2017 | Sjolund et al. |
| 2017/0127242 | A1 | 5/2017 | Arora et al. |
| 2017/0206498 | A1 | 7/2017 | Hamm et al. |
| 2017/0242114 | A1 | 8/2017 | Bevan |
| 2017/0249073 | A1 | 8/2017 | Thompson et al. |
| 2017/0261594 | A1 | 9/2017 | Wu et al. |
| 2017/0289760 | A1 | 10/2017 | Sainfort et al. |
| 2017/0359680 | A1* | 12/2017 | Ledvina ............... H04W 4/02 |
| 2017/0372255 | A1 | 12/2017 | Vankipuram et al. |
| 2018/0012079 | A1 | 1/2018 | Blanchflower |
| 2018/0012267 | A1 | 1/2018 | Bordewieck et al. |
| 2018/0012290 | A1 | 1/2018 | Houston et al. |
| 2018/0077533 | A1 | 3/2018 | Pandharipande et al. |
| 2018/0077534 | A1 | 3/2018 | Le Grand et al. |
| 2018/0121939 | A1 | 5/2018 | Eswaran et al. |
| 2018/0317073 | A1* | 11/2018 | Taylor ............... G06Q 30/0631 |

FOREIGN PATENT DOCUMENTS

| | | |
|---|---|---|
| WO | 2014176574 A1 | 10/2014 |
| WO | 2015127491 A1 | 9/2015 |
| WO | 2016154312 A1 | 9/2016 |
| WO | 2017096027 A1 | 6/2017 |

OTHER PUBLICATIONS

Associated Press, Every step you take . . . Retailers reveal smart floors that will tell them exactly what shoppers are doing, 6 pages, 2018.

Bahadori et al., Real-time people localization and tracking through fixed stereo vision, 32 pages, http://www.diag.uniroma1.it/~iocchi/publications/iocchi-ieaaie05.pdf, 2006.

Castano et al., A zigbee and RFID hybrid system for people monitoring and helping inside large buildings, 7 pages, https://www.researchgate.net/publication/229034053_A_ZigBee_and_RFID_hybrid_system_for_people_monitoring_and_helping_inside_large_buildings?nrichld=rgreq108b90a2278336826d061d4b9f5ba348XXX&enrichSource=Y292ZXJQYWdlOzlyOTAzNDA1MztBUzox.

Gao et al., Multi-story indoor floor plan reconstruction via mobile crowdsensing, IEEE Transactions of Mobile Computing, vol. 15, No. 6, pp. 1427-1442, 2016.

Hwangbo et al., Store layout optimization using indoor positioning system, International Journal of Distributed Sensor Networks, vol. 13, No. 2, 13 pages, 2017.

Lee et al., A review of the techniques for indoor location based service, International Journal of Grid and Distributed Computing, vol. 5, No. 1, 22 pages, 2012.

Pandey Drive of technology in the retail sector, HermeneuticS-A Bi-annual International Journal for Business and Social Studies, retrieved from: http://www.yera.org.in/file/Merged_File/2012-March_Issue.pdf#page=44, 93 pages, 2012.

Puggelli et al., A routing-algorithm-aware design tool for indoor wireless sensor networks, 8 pages, Retrieved from the Internet: https://iris.polito.it/retrieve/handle/11583/2501034/57551/icnc.pdf, 2018.

Shang et al., GridiLoc: A backtracking grid filter for fusing the grid model with PDR using smartphone sensors, Sensors, Retrieved from the Internet: https://iris.polito.it/retrieve/handle/11583/2501034/57551/icnc.pdf, 22 pages, 2016.

Sikeridis et al., Occupant tracking in smart facilities: an experimental study, GlobalSIP, pp. 818-822, 2017.

Sturari et al., Robust and affordable retail customer profiling by vision and radio beacon sensor fusion, Pattern Recognition Letters, 11 pages, 2016.

Welsh et al., Programming sensor networks using abstract regions, https://dl.acm.org/citation.cfm?id=1251178, 14 pages, 2004.

You, Using mobile phones to monitor shopping time at physical stores, IEEE Cs, retrieved from: http://mclab.citi.sinica.edu.tw/cwyou/papers/UsingMobilePhonesToMonitorShoppingTimeAtPhysicalStores.pdf, 7 pages, 2011.

Zhu, IOT gateway: Bridging wireless sensor networks into Internet of things, IEEE, IFIP International Conference on Embedded and Ubiquitous Computing, 6 pages, 2010.

* cited by examiner

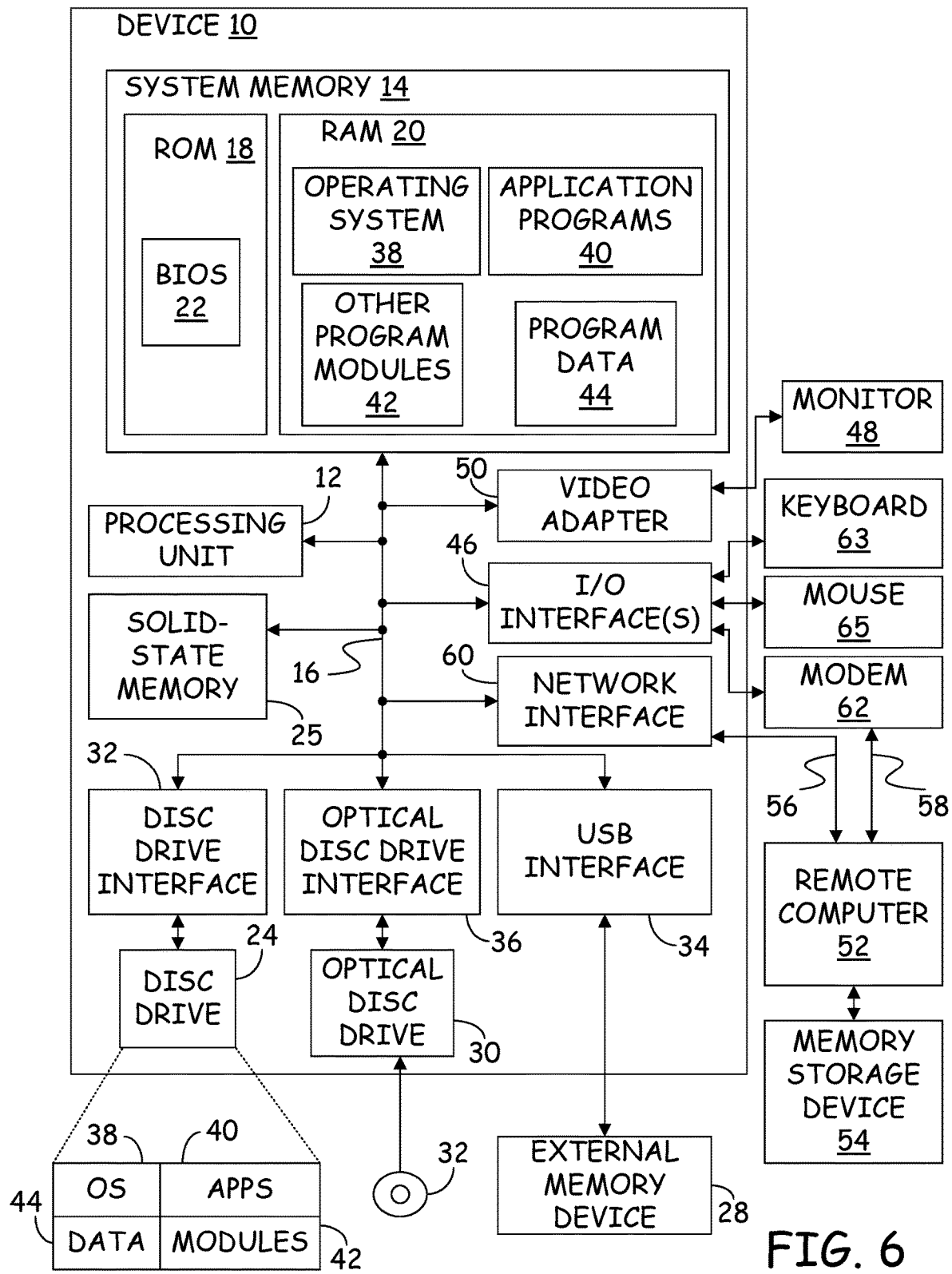

ADAPTIVE SPATIAL GRANULARITY BASED ON SYSTEM PERFORMANCE

CROSS-REFERENCE TO RELATED APPLICATION

The present application is based on and claims the benefit of U.S. provisional patent application Ser. No. 62/869,802, filed Jul. 2, 2019 the content of which is hereby incorporated by reference in its entirety.

BACKGROUND

In modern retail stores, RFID and other systems are being implemented that use sensor data to determine the position of individual product units within the store. In some systems, the sensor data is updated every second thereby generating a huge amount of sensor data over the course of a day. Retail stores are also installing local area network access points that are able to detect wireless network signals generated by mobile phones and other mobile devices. These detected wireless signals can then be used to determine the position of the mobile devices within the store. Additional forms of technology are also used for detecting the location of customers and employees within the retail store using other types of sensor systems, such as video systems, acoustic systems, and systems that receive position information determined by a mobile device carried by the customer or employee. Each of these systems is capable of providing sensor data at least once per second resulting once again in a large amount of sensor data over a course of a day.

The discussion above is merely provided for general background information and is not intended to be used as an aid in determining the scope of the claimed subject matter. The claimed subject matter is not limited to implementations that solve any or all disadvantages noted in the background.

SUMMARY

A method includes monitoring performance of a system that determines locations of items in a retail store based on sensor values from a collection of sensors in the retail store. When the performance is insufficient to process the sensor values as the sensor values are received, a spatial resolution used to determine the locations of the items in the retail store is reduced.

In accordance with a further embodiment, a computer-implemented method includes selecting a spatial resolution for identifying locations of items in a retail store. For each of a plurality of sampling periods, wherein the sampling periods are temporally spaced to define a reception rate of sensor messages, sensor messages containing respective sensor values are received. Locations for items in the retail store are identified at the selected spatial resolution based on the received sensor messages for the sampling period, wherein the locations are identified during an identification period associated with the sampling period and the identification periods are temporally spaced to define an identification rate. When the receiving rate is faster than the identification rate, a lower spatial resolution is selected for identifying locations of items in the retail store. For each of a plurality of further sampling periods, wherein the further sampling periods are temporally spaced to define the reception rate, sensor messages containing respective sensor values are received. Locations for items in the retail store are then identified at the lower spatial resolution based on received sensor messages for the further sampling periods.

In accordance with a still further embodiment, a computer includes a memory and a processor. The memory contains an input data array and an output data array. The processor executes a first spatial resolution location identifier to identify locations of items in a retail store at a first spatial resolution based on sensor data stored in the input data array. The processor also executes a performance monitor to determine when the first spatial resolution location identifier is unable to determine locations fast enough and in response causes the first spatial resolution location identifier to stop executing and causes a second spatial resolution location identifier to start executing to identify locations of items in the retail store at a second spatial resolution that is a lower spatial resolution than the first spatial resolution based on sensor data stored in the input data array.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 provides a block diagram of an exemplary computer used to execute the various embodiments.

DETAILED DESCRIPTION

Figure 1:
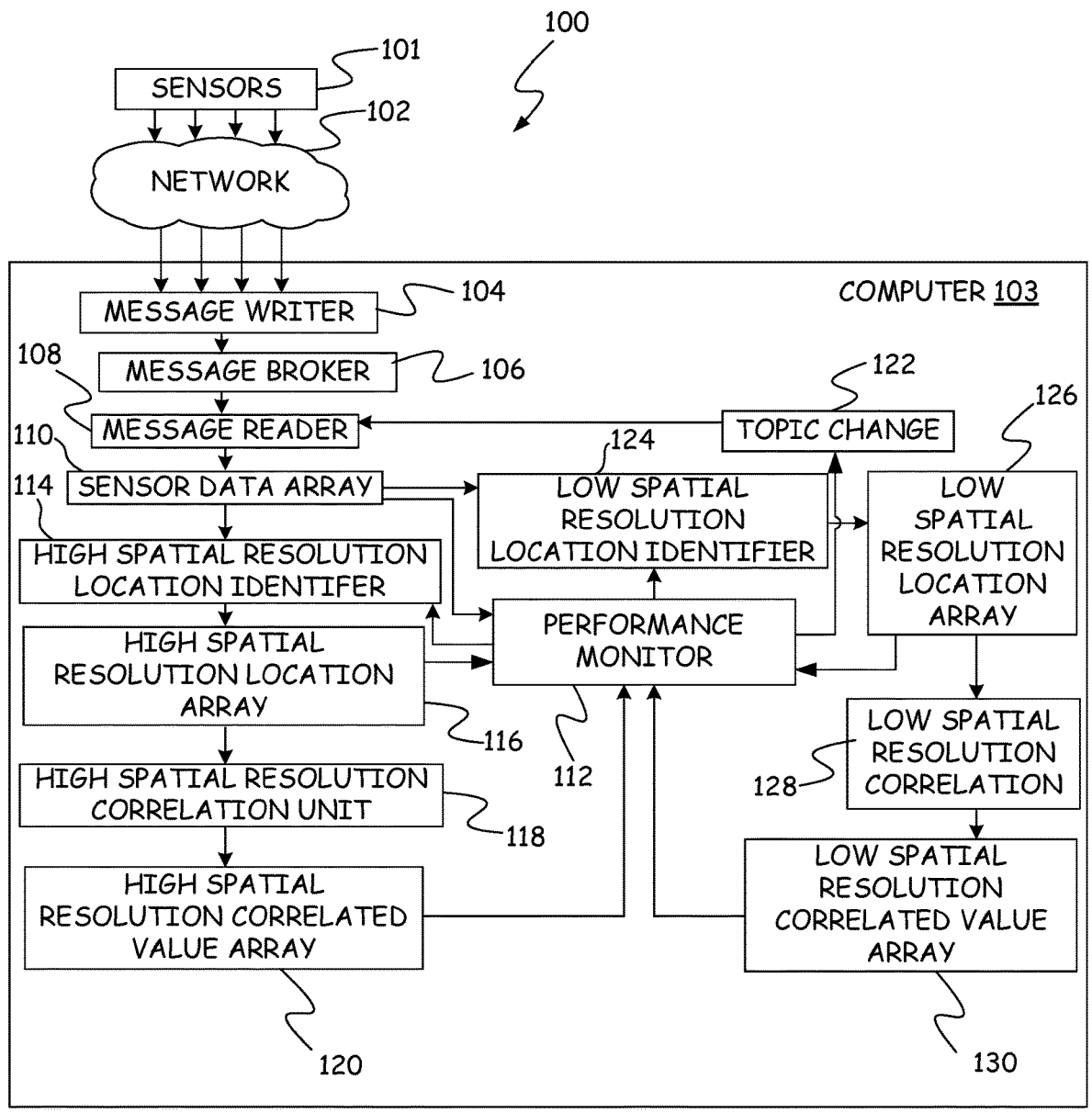
FIG. 1 is a block diagram of a system in accordance with one embodiment.

Designing systems to track the positions of people and products in a retail store and to correlate the positions of people and products as quickly as sensor data is provided to the system is challenging for several reasons. First, in order for the system to be highly responsive, the sensor data should be collected as often as possible. However, as noted above, collecting sensor data for each product unit and each person within a store at each second involves processing a huge amount of sensor data each second. Second, such systems are more useful when the accuracy of the determined positions is higher. However, determining more accurate positions generally requires more processing than generating less accurate positions. As a result, if the accuracy of the position information is set too high, it is possible that the system will not identify locations for all of the products/people for a first sampling period of sensing data before a second sampling period of sensor data begins. For example, if new sensor data is received every second, the location information must also be determined every second or the location information will not reflect what is currently happening in the store. However, setting the accuracy of the location information too low results in less useful position information for the system.

The embodiments described below provide systems and methods for adaptively changing the granularity of position determinations in response to real-time assessments of the performance of the system. When the system is no longer able to produce locations as fast as sensor data is received, the embodiments decrease the spatial resolution of the position determinations and when no lower spatial resolution is available begin to reduce the temporal resolution of the system. Similarly, when the system has recovered and is able to provide position information as fast as sensor data is received, the temporal resolution is first increased if it was previously decreased and then the spatial resolution is increased until it reaches the highest available spatial resolution or the performance begins to decrease again.

For example, the position of a cell phone can be determined by measuring the signal strength of a Wi-Fi signal that is broadcast by the phone. In general, the more sensors that sense the Wi-Fi signal, the more accurate the determined position. However, as more sensors are used, more processing is required. For instance, if a single sensor is used, a circle of possible locations for the phone can be determined by retrieving the position of the sensor and calculating a distance between the phone and the sensor based on the signal strength. The resulting distance becomes the radius of the circle and the position of the sensor becomes the center of the circle. However, if five sensors are used, five separate circles are determined and a calculation must be performed to identify where the circles overlap. These additional computations can cause the location determination system to fall behind the incoming data.

In the discussion below, the term "item" is used to refer generically to people, mobile devices, equipment and product units.

Figure 2:
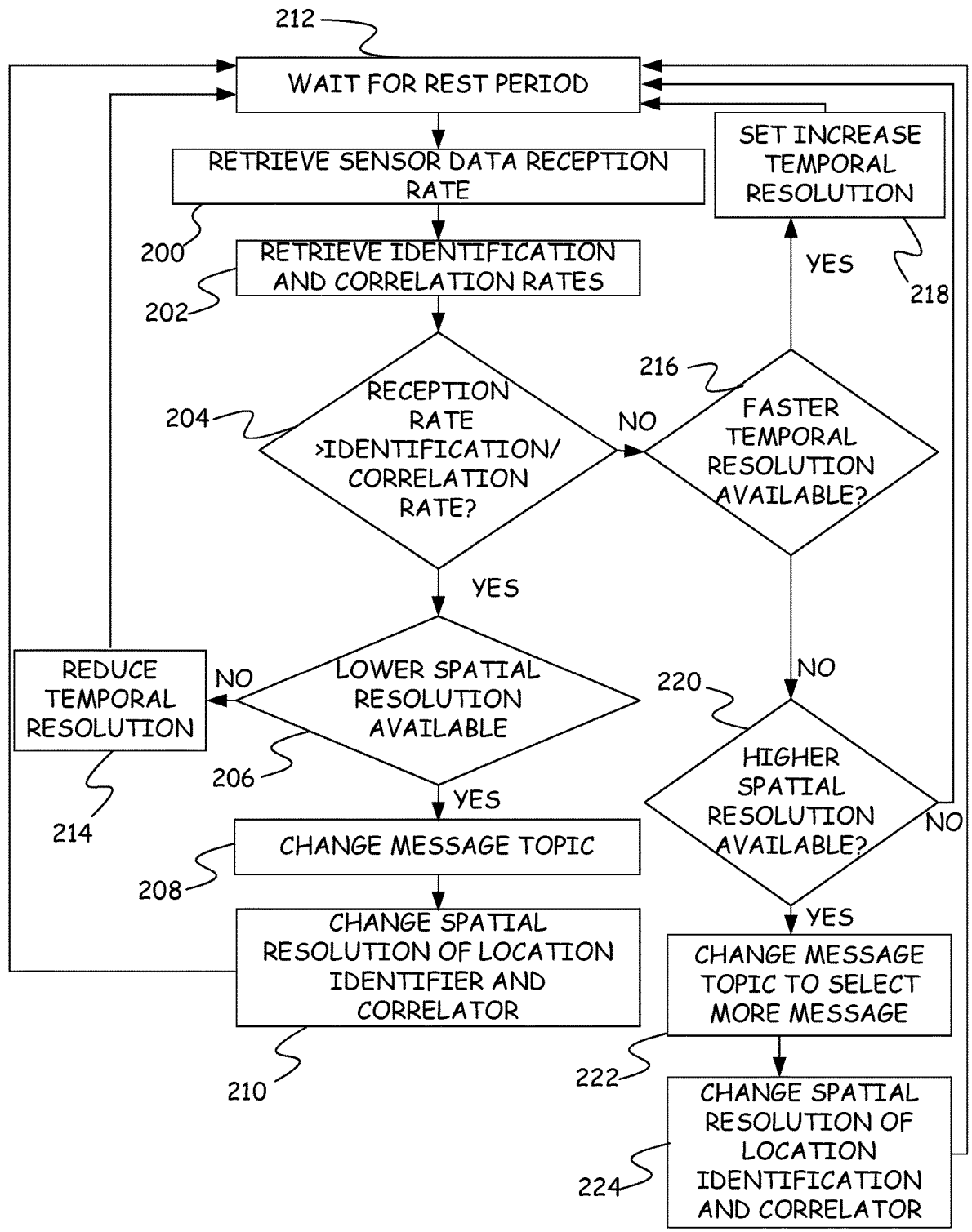
FIG. 2 is a flow diagram of dynamically adjusting spatial and temporal resolution based on performance of a system in accordance with one embodiment.

FIG. 1 provides block diagram of a system 100 for providing a dynamic spatial resolution by monitoring the performance of the system. FIG. 2 provides a flow diagram of a method for dynamically adjusting the spatial and temporal resolution of the system of FIG. 1 in accordance with one embodiment.

In FIG. 1, a plurality of sensors 101 provide sensor data for various items in a retail store such as individual product units, mobile devices and people. This sensor data is passed through a network 102, such as a wireless network, a wired network or a hybrid wireless and wired network to a message writer 104 in a computer 103. Message writer 104 writes a separate sensor message for each packet of sensor data that it receives and sends each sensor message to a message broker 106. In accordance with one embodiment, each message includes a sensor value, a sensor identifier, a time stamp when the sensor value was received and, if available, an identifier for the sensed item, such as an identifier for the product unit, an identifier for a mobile device, an identifier for a piece of equipment or an identifier for a person.

Each message can also be associated with a message topic, which allows message readers, discussed below, to request only those messages associated with a particular topic. In particular, sensor data associated with certain collections of sensors can be identified by one topic while sensor data associated with other collections of sensors can be identified by another topic.

Message broker 106 receives and stores the messages from message writer 104 and maintains an index for each topic indicating which messages have yet to be read from the message broker. Message broker 106 also handles requests for a next message within a particular topic from a message reader 108. Upon receiving such a request, message broker 106 uses the index to locate the next message that is to be provided to message reader 108 and increments the index to the next unread message for the topic.

Message reader 108 requests messages related to a particular topic, parses the information in each received message, and loads the parsed data into a sensor data array 110, which is also referred to as an input data array. In accordance with one embodiment, sensor data array 110 is maintained in memory so as to improve the speed at which the sensor data can be accessed. Because sensor data array 110 is maintained in memory and a large amount of sensor data is being received every second, older sensor data must be removed from array 110 as quickly as possible after it has been used to identify a location so as to avoid running out of memory.

The sensor data is temporally grouped into sampling periods such that one sensor value is provided for each sensor during each sampling period. The number of sampling periods that occur over some fixed period of time defines a sampling rate. In accordance with one embodiment, the sensor messages for the sampling periods are stored in sensor data array 110 at a reception rate that is the same as the sampling rate. Thus, with each new sampling period, a sensor value for each sensor is stored in sensor data array 110 and the new sensor values for a sensor are stored at the reception rate/sampling rate.

Figure 3:
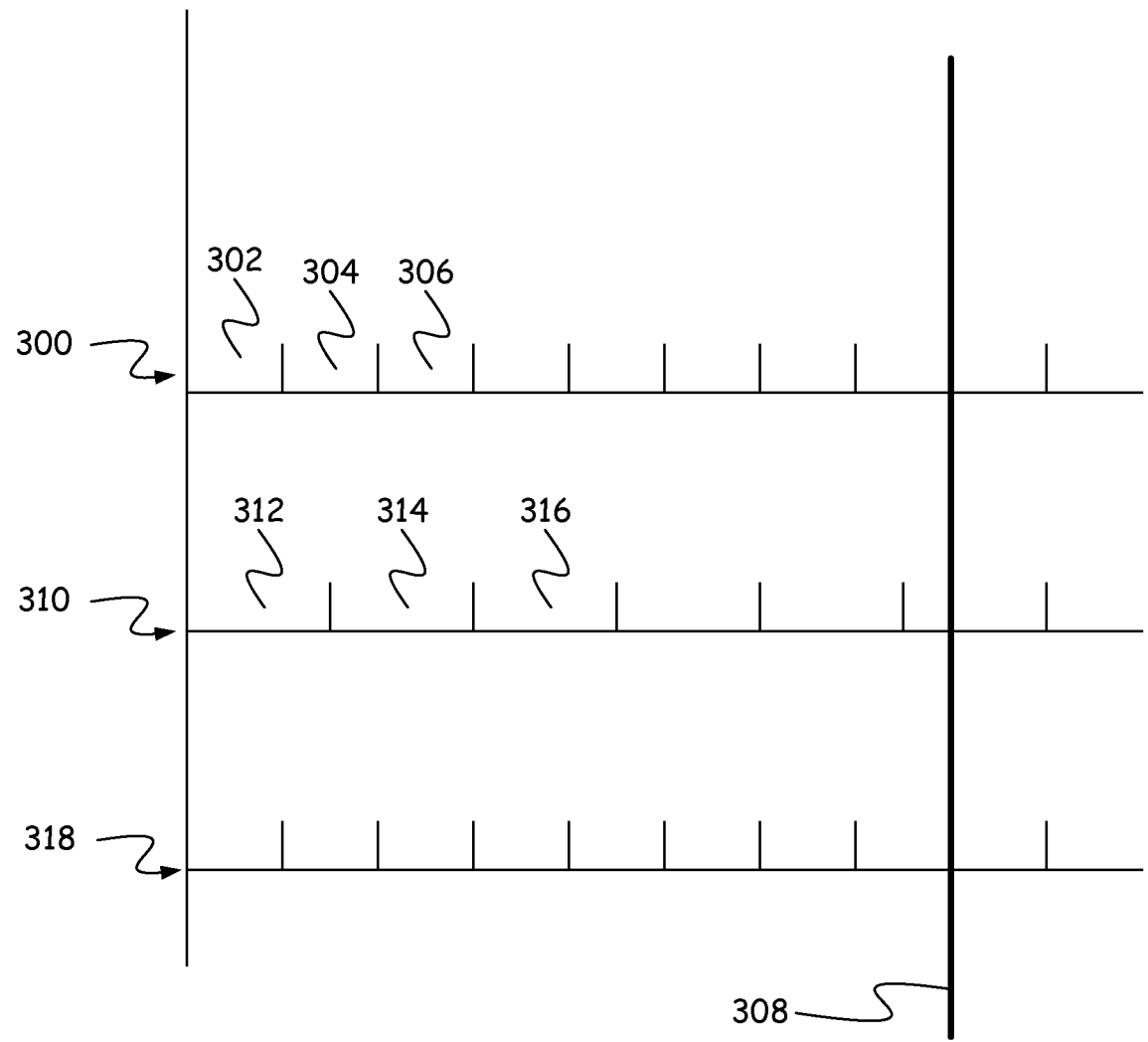
FIG. 3 provides timing graphs showing sampling periods and identification periods.

FIG. 3 provides a timing graph 300 showing a sequence of sampling periods, such as sampling periods 302, 304 and 306, that depict the rate at which sensor data is added to sensor data array 110. In particular, the reception rate can be determined as the number of sampling periods that take place in a fixed amount of time represented by line 308.

When system 100 begins operation, it is assumed that the system will be able to keep pace with the reception rate of sensor data. As a result, the system initially uses a high spatial resolution location identifier 114 to identify a high spatial resolution location for each item in sensor data array 110 for each sensor measuring period. For example, the high spatial resolution location can give a position that is accurate to within 1 meter of the true position of the item. In other embodiments, a higher spatial resolution is possible, such as one that is able to identify the location of an item to within 1 foot of the true location. The high spatial resolution location for each item is stored in a high spatial resolution location array 116, which in some embodiments is considered to be an output array while in other embodiments is considered an intermediate array.

In accordance with one embodiment, each sampling period has an associated identification period representing the period of time required to identify a location for each item in the sensor data and to load those locations into array 116. The number of identification periods in the fixed time period represents an identification rate. For example, timing graph 310 of FIG. 3 shows a sequence of identification periods, including identification periods 312, 314 and 316. The identification rate of graph 310 is the number of identification periods that occur within fixed time 308.

The high spatial resolution locations 116 are provided to a high spatial resolution correlation unit 118, which correlates at least two high spatial resolution locations to form a correlated value that is stored in a high spatial resolution correlated value array. One example of a high spatial resolution correlated value is that two items are close enough to one another to be considered as being together during the sensing period. For example, the correlated value can indicate that two items are within 1 meter of each other.

Each sampling period has a corresponding correlation period representing an amount of time during which correlation values for the sampling period are written to array 120. The correlation periods are temporally separated to produce a correlation rate, which is the number of correlation periods in the fixed period of time.

As discussed below, a performance monitor 112 tracks the performance of system 100 to ensure that the system is operating fast enough to handle the sensor data provided to sensor data array 110 in real time. To handle the sensor data in real time, the location identification rate and the correlation rate must be the same as the sampling rate. If the sampling rate is greater than the identification rate or the correlation rate, system 100 will fall further and further behind the incoming sensor data and will no longer be providing location or correlation values that correspond to the current location of items in the store.

FIG. 2 provides a flow diagram of a method used by performance monitor 112 to dynamically change the spatial resolution for the location identification and correlation performed by the system when the performance of the system is not fast enough to keep up with the incoming sensor data.

In step 200 of FIG. 2, performance monitor 112 retrieves the reception rate at which sensor data is being added to sensor data array 110. In accordance with one embodiment, the sensor data reception rate is the number of times sensor data from each sensor in the store is received per minute.

At step 202, performance monitor 112 retrieves either the identification rate or the correlation rate representing the rate at which locations for items are being updated in array 116 or the rate at which correlation values are being updated in array 120. At step 204, performance monitor 112 determines if the sensor data reception rate is greater than the identification rate or the correlation rate. For example, in FIG. 3, the reception rate of graph 300 is shown to be greater than the identification rate of graph 310 since there are eight sampling periods per fixed time 308 for graph 300 but only six identification periods per fixed time 308 for graph 310. If the sensor data reception rate is greater than the identification rate or the correlation rate, system 100 is not keeping up with the rate at which sensor data is being received. In response, at step 206, performance monitor 112 determines if a lower spatial resolution is available. In other words, performance monitor 112 determines if the system is able to identify location values and perform correlation at a lower resolution.

If a lower spatial resolution is available at step 206, performance monitor 112 changes the message topic used by message reader 108 using topic change 122 at step 208. In accordance with one embodiment, when using high spatial resolution location identifier 114, sensor messages from a first collection of sensors are read by message reader 108. When the topic is changed at step 208, sensor messages from a second collection of sensors are read by message reader 108 where the second collection of sensors is smaller than the first collection of sensors and in some embodiments is a subset of the sensors in the first collection of sensors.

At step 210, performance monitor 112 changes the spatial resolution of the location identifier and correlator by invoking low spatial resolution location identifier 124 and low spatial resolution correlation module 128 at step 210. Thus, instead of using high spatial resolution location identifier 114, low spatial resolution location identifier 124 is used when the system is unable to keep up with the sensor messages being provided by message reader 108.

Low spatial resolution location identifier 124 determines the locations of items at a lower spatial resolution than high spatial resolution location identifier 114. For example, where high spatial resolution location identifier 114 may identify the location of an item to within one meter, low spatial resolution location identifier 124 identifies the location of an item to within an aisle of the store. Low spatial resolution location identifier 124 produces a low spatial resolution location for each item that is stored in low spatial resolution location array 126 at an identification rate. The low spatial resolution locations 126 are provided to a low spatial resolution correlation module 128, which correlates the locations of two or more items to generate a low resolution correlated value that is stored in low resolution correlated value array 130 at a correlation rate. For example, low spatial resolution correlation module 128 can correlate the low spatial resolution locations of two items to indicate that the two items are in the same aisle during a sensor sampling period.

The process of FIG. 2 then returns to a waiting step 212 where performance monitor 112 waits for a rest period while the system processes sensor data using the low spatial resolution sensor messages, low resolution location identifier and low resolution correlation. After the rest period ends, performance monitor 112 again retrieves the sensor data reception rate and the identification rate of array 126 and the correlation rate of array 130 at steps 200 and 202 and determines if the sensor data reception rate is still greater than the identification rate or the correlation rate at step 204.

If the sensor data reception rate is no longer greater than the identification rate and the correlation rate at step 204, the adjustment to the spatial resolution has allowed the system keep up with the incoming sensor data. This is shown in FIG. 3 where timing graph 318 shows a sequence of identification periods, such as periods 320, 322 and 324 for low spatial resolution location identification given the sampling periods of graph 300. As shown in FIG. 3, the identification rate of graph 318 is the same as the reception rate of graph 300 with eight identification periods occurring within the fixed time period 308 and eight sampling periods occurring within the fixed time period 308.

In order to optimize system 100, after determining that the sensor data reception rate is not greater than the identification rate and the correlation rate at step 204, system monitor 112 determines if a faster temporal resolution is available at step 216. If a faster temporal resolution is available, the temporal resolution of the identification and correlation are increased at step 218 and the process returns to step 212 to wait. If a faster temporal resolution is not available, system monitor 112 determines if a higher spatial resolution is available for the location identification. If a higher spatial resolution is available, performance monitor 112 uses topic change 122 to change the message topic used by message reader 108 to select messages containing sensor data from a different collection of sensors at step 222. Performance monitor 112 then changes the spatial resolution of the location identification and correlation by, for example, instantiating high spatial resolution location identifier 116 and high spatial resolution correlation module 118 at step 224. After step 224, the process returns to step 212 to wait for the changes to affect the system performance.

If the lowest available spatial resolution has been reached at step 206, performance monitor 112 reduces the temporal resolution of system 100 at step 214. In accordance with one embodiment, the temporal resolution is reduced by throwing away or ignoring sensor data for one or more sampling periods. After the spatial resolution has been lowered at step 210 or the temporal resolution has been reduced at step 214, the process returns to step 212 to wait for the rest period before seeing if the change in the spatial resolution or temporal resolution was sufficient for the system to keep up with the incoming sensor data. Note when the temporal resolution is reduced at step 214, the sensor data reception rate is changed from the rate at which data is written to the sensor data array 110, to the rate at which the sensor data that is actually used is written to sensor data array 110.

As noted above, whenever the sensor data reception rate is no longer greater than the identification rate and the correlation rate, performance monitor 112 determines if a faster temporal resolution is available at step 216. In general, a faster temporal resolution will be available if the temporal resolution was previously reduced at step 214. If a faster temporal resolution is available, the temporal resolution is increased at step 218 by no longer discarding the sampling periods that were being discarded to reduce the temporal resolution. After step 218, the process returns to step 212 to wait for the changes to affect the performance of system 100.

Performance monitor 112 then performs steps 200-204 to see if the sensor data reception rate is greater than the identification rate or the correlation rate. If the sensor data reception rate is still not greater than the identification rate and the correlation rate at step 204, performance monitor 112 determines once again whether a faster temporal resolution is available at step 216. When the temporal resolution cannot be increased at step 216, the process continues at step 220 where performance monitor 112 determines if a higher spatial resolution is available. If a higher spatial resolution is available, performance monitor 112 uses topic change 122 to change the message topic used by message reader 108 to select messages containing sensor data from a different collection of sensors at step 222. Performance monitor 112 then changes the spatial resolution of the location identification and correlation by, for example, instantiating high spatial resolution location identifier 116 and high spatial resolution correlation module 118 at step 224. After step 224, the process returns to step 212 to wait for the changes to affect the system performance.

The process of FIG. 2 continues to cycle through dynamically changing the spatial and temporal resolution of the system so as to ensure that identification of locations and the correlation of those locations is being performed at the highest possible temporal and spatial resolution while ensuring that the sensor data reception rate does not exceed the identification or correlation rate.

In accordance with a further embodiment, performance monitor 112 is configured to receive override instructions that will interrupt the dynamic adjustments to the spatial and temporal resolution. Such override instructions can cause high spatial resolution location identifier 114 and high spatial resolution correlation unit 118 to execute during an event that requires high resolution location and correlation information, such as during a probable theft event. Such overrides can be applied to the entire retail store or to one part of the store. In some embodiments, when high spatial resolution location identifier is used, performance monitor 112 changes message topics to messages from higher resolution sensors. For example, instead of using Wi-Fi sensor messages, messages from cameras can be selected where each message includes a frame of camera data. The location of a person can then be determined from the camera images instead of from the strength of the Wi-Fi signals.

In accordance with a still further embodiment, instead of changing the resolution of the location identification when performance monitor determines that the system is falling behind the sensor data, performance monitor 112 changes the message topic to messages that include location estimates for items. Such location estimates are generated by the sensors or by an intermediary between the sensors and computer 103. By relying on other systems to estimate the locations of items, performance monitor 112 is able to reduce the number of computations that computer 103 must perform. Not all sensors are able to provide such location estimates, so the locations of more items can be determined by location identifiers 114 and 124. As such, once the performance of computer 103 is able to keep up with the incoming sensor data, performance monitor 122 switches back to the original message topic.

Figure 4:
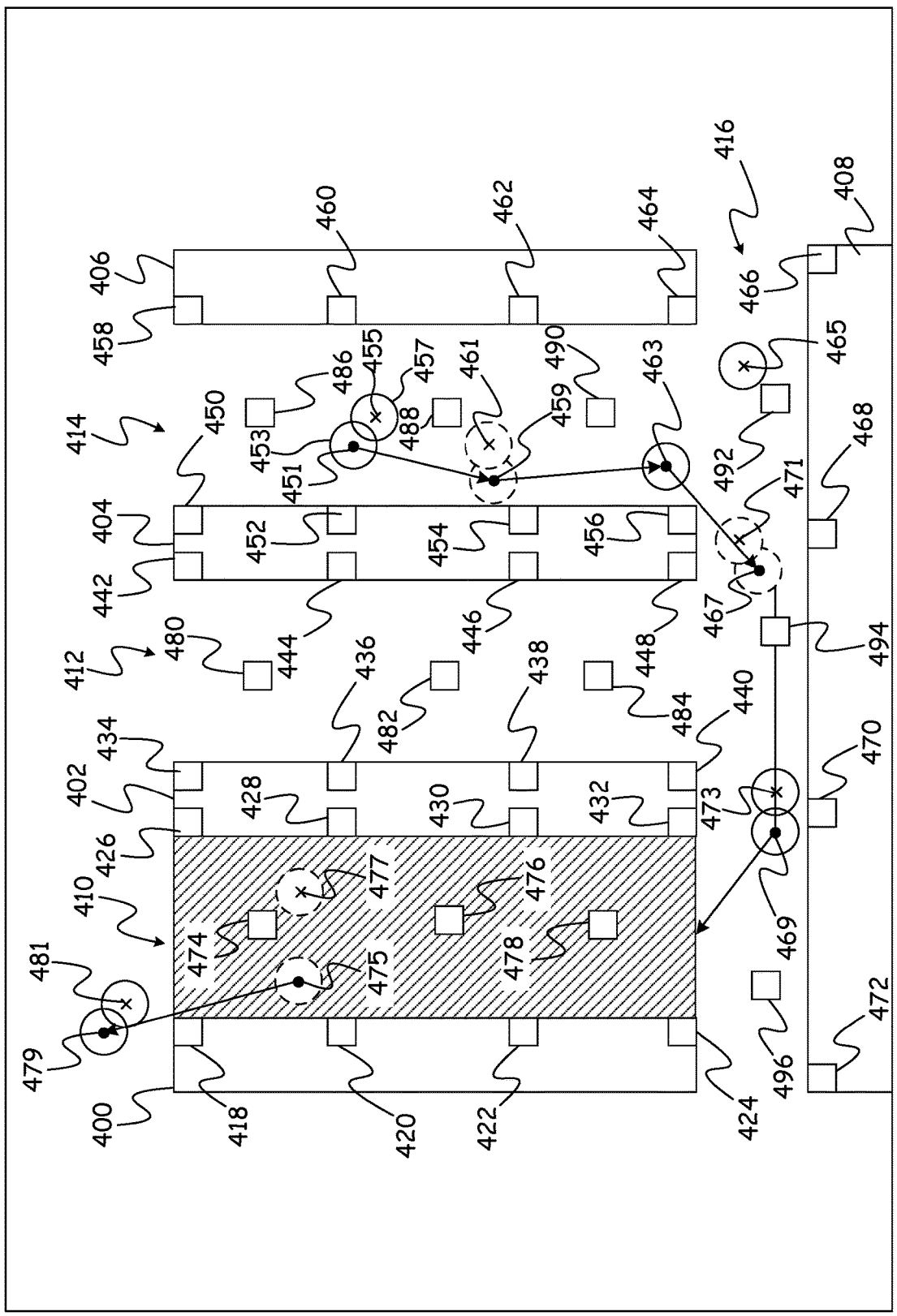
FIG. 4 provides a plan view of a retail store.

FIG. 4 provides a plan view of a retail environment showing shelving 400, 402, 404, 406 and 408, which define aisles 410, 412, 414 and 416. The retail store of FIG. 4 includes position sensors 418, 420, 422, 424, 426, 428, 430, 432, 434, 436, 438, 440, 442, 444, 446, 448, 450, 452, 454, 456, 458, 460, 462, 464, 466, 468, 470 and 472, which are positioned along shelving units. The retail store of FIG. 4 also includes ceiling-mounted position sensors 474, 476, 478, 480, 482, 484, 486, 488, 490, 492, 494 and 496.

Figure 5A:
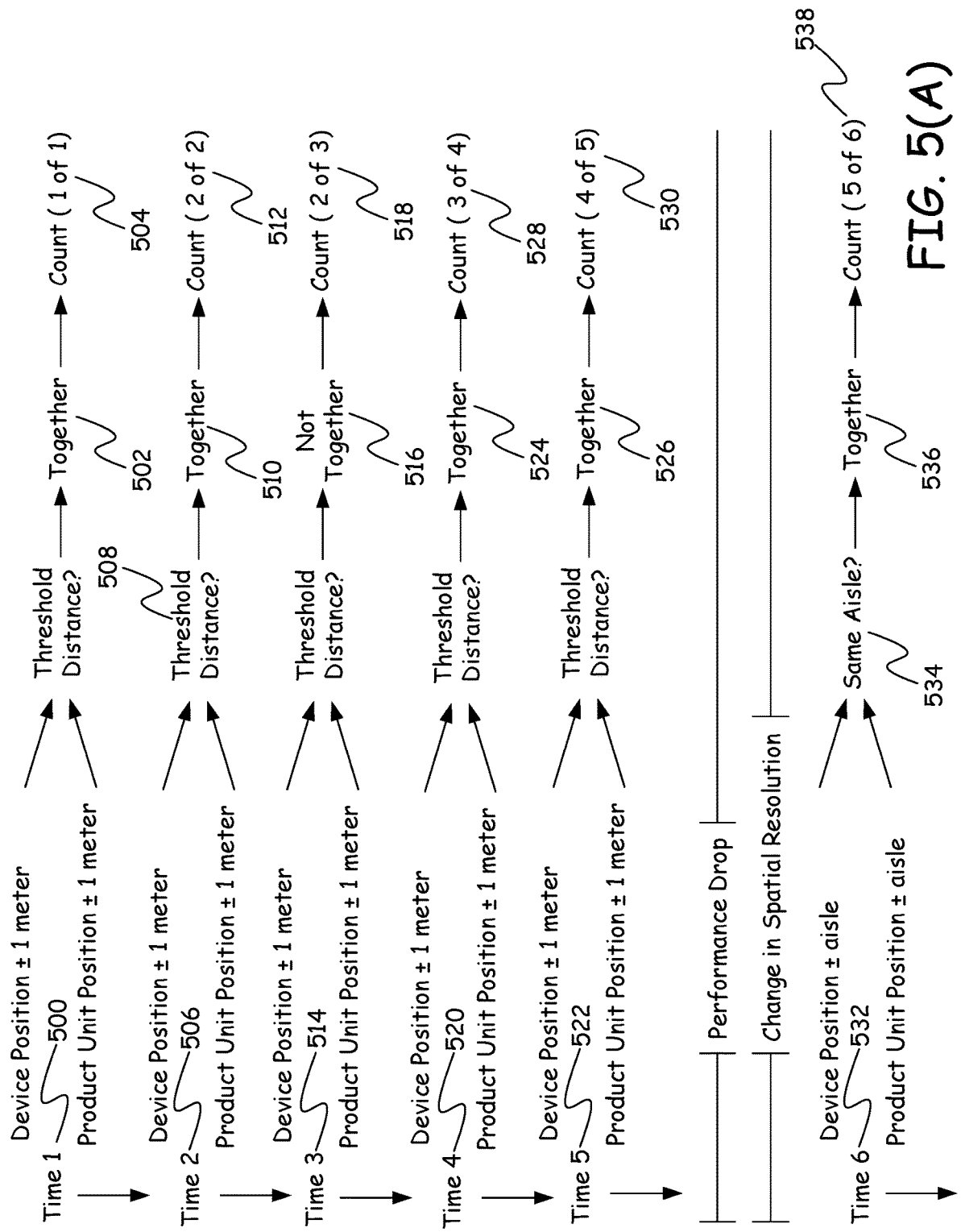
FIGS. 5(A) and 5(B) show a timing diagram depicting changes in the spatial and temporal resolution across multiple sampling periods for one exemplary execution of one embodiment.
Figure 5:
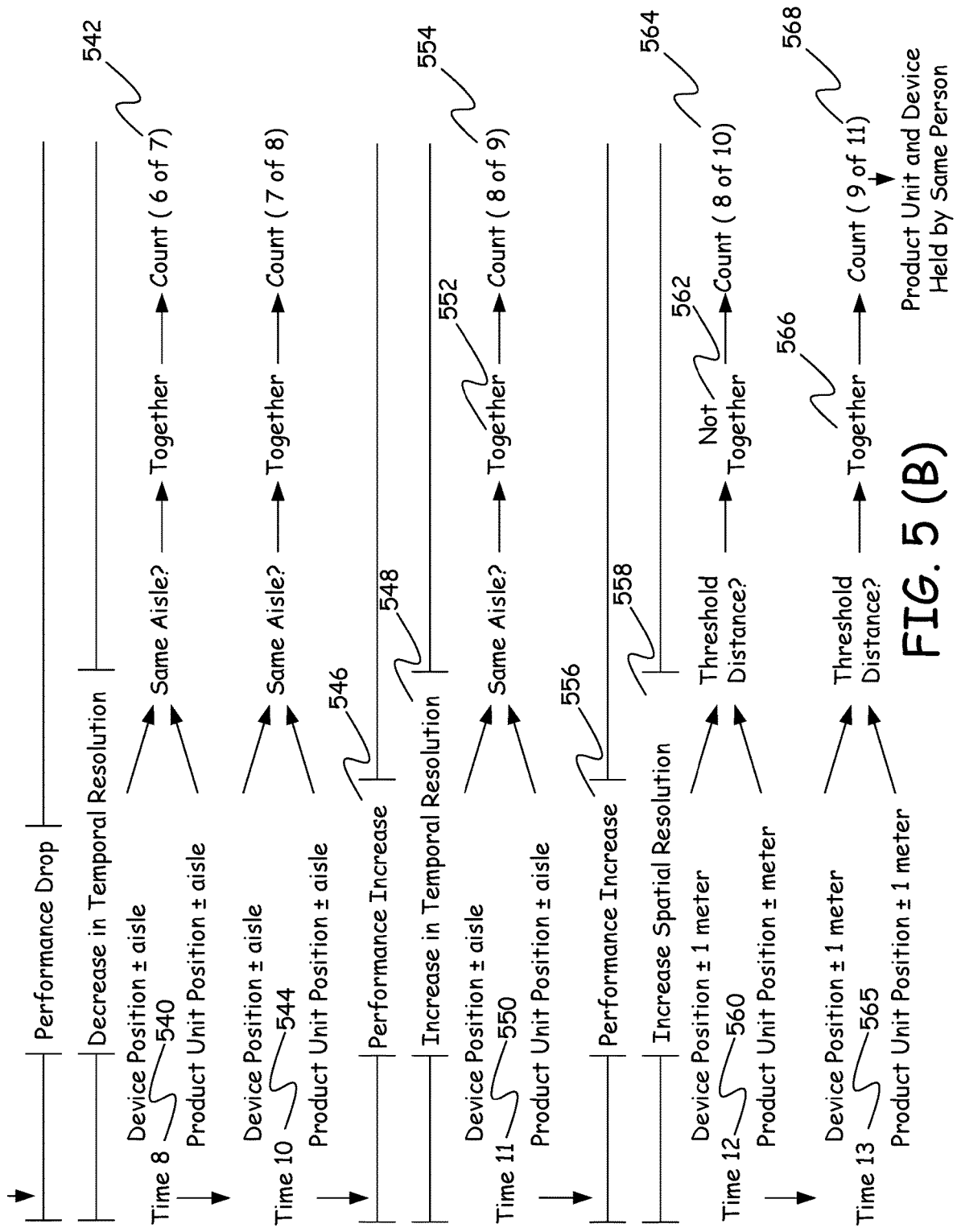

FIGS. 5(a) and 5(b) show a timing diagram indicating the reception of sensor data in the formation of correlated values for a collection of sensor sampling periods. At sampling period 500 which occurs at time 1, a device position indicated by dot 451 in FIG. 4 is received that is within one meter of the true position of the device as indicated by the circle 453 of FIG. 4. In addition, a position of a product unit, represented by x 455 in FIG. 4, is provided that is within 1 meter of the true position as indicated by circle 457 of FIG. 4. The device position and product unit position are used at sampling period 500 to determine if the device and the product unit are within a threshold distance of each other and since they are within the threshold distance, the high spatial resolution correlation module 118 determines that the device and the product unit are together as indicated by entry 502. In addition, a running count of the number of times the device and product unit have been determined to be together and a running count of the number of times the correlation has been performed are increased as indicated by entry 504.

At sensor sampling period 506, associated with sampling time 2, device position 459 and product unit position 461 are determined with a high spatial resolution of one meter and their high spatial resolution positions are provided to high spatial resolution correlation unit 118, which determines that they are within a threshold distance at step 508 and therefore are marked as being together as indicated by entry 510 and the counts are increased as indicated by entry 512. At sampling period 514, associated with time 3, the device position and the product unit position are again determined by high spatial resolution location identifier 114 to within one meter of the true position. As indicated in FIG. 4, the device position 463 and the product unit position 465 identified by high spatial resolution location identifier 114 are significantly separated from each other, such that high spatial resolution correlation module 118 determines that the device and product unit are not together as shown by entry 516. As a result, the count of the number of correlations performed is increased while the count of the number of times the device and product unit were together is left the same as indicated by entry 518. At sampling period 520, associated with time period 4 and sampling period 522 associated with time period 5, the high spatial resolution location identifier 114 identifies locations 467 and 469 for the device and locations 471 and 473 of the product unit and the high spatial resolution correlation module 118 determines that the device and product unit were together at both of the time periods as indicated by entries 524 and 526 resulting in increases of the counts as indicated by entries 528 and 530.

During sampling period 522, performance monitor 112 determines that the system performance has dropped as indicated by entry 531 and is no longer capable of keeping up with the reception rate of the sensor data. In response, performance monitor 112 changes the spatial resolution so as to receive low resolution sensor messages and to use low spatial resolution location identifier 124 and low spatial resolution correlation module 128 as indicated by entry 533. Changing the message topic during the change in spatial resolution causes message reader 108 to change from reading messages for all of the sensors shown in FIG. 4 to reading messages only for the ceiling sensors 474-496. Because fewer sensor messages are utilized, it is not possible to identify the location of the device or product unit with the same resolution. Thus, instead of being able to determine the location within 1 meter, the position of the device and the position of the product unit can now only be determined on an aisle basis. Thus, at sampling period 532, associated with time 6, the device position and the product unit position are determined by low spatial resolution location identifier 124 to be within a particular aisle but without any indication of where in the aisle the device and product unit are positioned. The low spatial resolution correlation module 128 then performs a low spatial resolution correlation as shown by entry 534 that determines if the device and the product unit are within the same aisle. If the low spatial resolution correlation module 128 determines that the device and the product unit are in the same aisle, the low spatial resolution correlation module 128 produces low spatial resolution correlated value 536 that indicates that the device and the product unit are together and the count of the number of sampling periods when the device and product unit were together is increased as indicated by entry 538. Note that the values for the low resolution and high resolution correlated values are the same and can be either "together" or "not together." Further note that the count of the number of sampling periods when the device and product unit were considered to be together is handled the same way regardless of the spatial resolution used for location identification and correlation.

During sampling period 532, system performance 112 once again determines that the system is not able to keep up with the sensor data reception rate even at the lowest spatial resolution. Since there are no lower spatial resolutions available, performance monitor 112 decreases the temporal resolution as shown by sampling period 540. In particular, system performance monitor 112 causes the sensor samples for time period 7 to be discarded and the next sensor data that is processed is for time 8. During sampling period 540, the low spatial resolution location identifier 124 and the low spatial resolution correlation module 128 are still being used. As a result, the device position and product unit position is at the aisle level and the correlation involves determining whether the device and product unit are in the same aisle.

As indicated by entry 542, the count of the number of correlations that have been performed is increased by one even though two sampling periods have passed since the last correlation.

The sampling period for time 9 is discarded since the low temporal resolution continues to be in place after sampling period 540. The next sampling period 544 thus takes place at time 10 using low spatial resolution location identifier 124 and low spatial resolution correlation module 128.

During sampling period 544, performance monitor 112 determines that a performance has increased as indicated by entry 546. As a result, performance monitor 112 increases the temporal resolution as indicated by entry 548. Since the temporal resolution has increased, the next sampling period is sampling period 550, which takes place at time 11 since the sampling period for time 11 does not need to be discarded. The lowest spatial resolution continues to be in place in sampling period 550 so the device position and product unit position are determined at the aisle level and low spatial resolution correlation module 128 is used to determine if the device and product unit are together. During sampling period 550, low spatial resolution correlation module 128 determines that the device and product unit are together in the same aisle as indicated by entry 552 and the count of the number of sampling periods when the device and product unit were together is increased as indicated by entry 554.

During sampling periods 532, 540, 544 and 550, the device and product unit are always deemed to be together in aisle 410 as shown by the hatch shading of aisle 410 in FIG. 4.

After sampling period 550, performance monitor 112 determines that the performance of the system has increased at step 556 and in response, performance monitor 112 increases the spatial resolution by changing the topic used by message reader 108 and switching back to high spatial resolution location identifier 114 and high spatial resolution correlation module 118 as indicated by entry 558.

As a result, at the next sampling period 560, which takes place at time 12, the device position and product unit position are determined within one meter of the true position and the device position and product unit position are compared to determine if they are within a threshold distance of each other. As shown in FIG. 4, the determined device position 475 and the determined product unit position 477 are not within the threshold distance of each other and as such the device and product unit are deemed to not be together as indicated by entry 562. As a result, the count of the number of times the product and device were together is not increased as indicated by entry 564. At sampling period 565, the device position and product unit position are again determined within one meter of their true positions resulting in positions 479 and 481 of FIG. 4. High spatial resolution correlation module 118 then compares those positions and determines that they are within the threshold distance of each other and as indicated by entry 564 sets the correlation value to indicate that the device and product are together. The count of the number of times the device and product unit are together is then increase as indicated by entry 568.

In accordance with some embodiments, the resulting count is then used to perform a further logic operation that determines whether the product unit and device were held by a same person. In particular, the ratio of the number of times a device and product unit were deemed to be together over the number of correlations that were performed is compared to a threshold percentage and when the ratio exceeds the threshold percentage, the product unit and device are considered to have been held by the same person.

FIG. 6 provides an example of a computing device 10 that can be used as computer 103 discussed above. Computing device 10 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 6. The network connections depicted in FIG. 6 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 6 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:
monitoring performance of a system that determines locations of items in a retail store based on sensor values from a collection of sensors in the retail store;
determining when the performance is insufficient to process the sensor values as the sensor values are received by determining that a sensor data reception rate is greater than at least one of a location identification rate or a correlation rate; and
in response, reducing a spatial resolution used to determine the locations of the items in the retail store.

2. The method of claim 1 further comprising:
continuing to monitor performance of the system after reducing the spatial resolution;
determining that the performance continues to be insufficient to process the sensor values as the sensor values are received; and
in response, reducing the temporal resolution used to determine the locations of the items in the retail store.

3. The method of claim 1 further comprising:
continuing to monitor performance of the system after reducing the spatial resolution;
determining that the performance is sufficient to process the sensor values as the sensor values are received; and
in response, increasing the spatial resolution used to determine the locations of the items in the retail store.

4. The method of claim 1 further comprising:
in response to the performance being insufficient to process the sensor values as the sensor values are received, designating a different collection of sensors to receive sensor values from.

5. The method of claim 1 further comprising correlating the locations of items to generate correlated values.

6. A computer-implemented method comprising:
selecting a spatial resolution for identifying locations of items in a retail store;

for each of a plurality of sampling periods, wherein the sampling periods are temporally spaced to define a reception rate of sensor messages:
  receiving sensor messages containing respective sensor values; and
  identifying locations for items in the retail store at the selected spatial resolution based on the received sensor messages for the sampling period, wherein the locations are identified during an identification period associated with the sampling period and the identification periods are temporally spaced to define an identification rate;
determining that the receiving rate is faster than the identification rate and selecting a lower spatial resolution for identifying locations of items in the retail store;
for each of a plurality of further sampling periods, wherein the further sampling periods are temporally spaced to define the reception rate:
  receiving sensor messages containing respective sensor values; and
  identifying locations for items in the retail store at the lower spatial resolution based on received sensor messages for the further sampling period.

7. The computer-implemented method of claim 6 wherein sensor messages for the sampling periods contain sensor values from a first collection of sensors in the retail store and the sensor messages for the further sampling period contain sensor values from a second collection of sensors that differs from the first collection of sensors.

8. The computer-implemented method of claim 7 wherein the second collection of sensors comprises fewer sensors than the first collection of sensors.

9. The computer-implemented method of claim 8 wherein the second collection of sensors for the further sampling periods is a subset of the first collection of sensors.

10. The computer-implemented method of claim 6 further comprising:
  for each of the plurality of sampling periods, correlating locations of items at the selected spatial resolution and for each of the plurality of further sampling periods, correlating locations of items at the lower spatial resolution.

11. The computer-implemented method of claim 6 wherein the locations for a further sampling periods are identified during a further identification period associated with the further sampling period and the further identification periods are temporally spaced to define a further identification rate, the method further comprising:
  determining that the reception rate is not greater than the further identification rate and in response reselecting the selected spatial resolution.

12. The computer-implemented method of claim 6 wherein the locations for a further sampling periods are identified during a further identification period associated with the further sampling period and the further identification periods are temporally spaced to define a further identification rate, the method further comprising:
  determining that the receiving rate is greater than the further identification rate and in response ignoring sensor messages for at least one sampling period.

13. A computer comprising:
a memory containing an input data array and an output data array;
a processor executing the instructions in the memory to perform steps comprising:
  executing a first spatial resolution location identifier to identify locations of items in a retail store at a first spatial resolution based on sensor data stored in the input data array;
  executing a performance monitor to determine when the first spatial resolution location identifier is unable to determine locations fast enough based on whether a rate at which data is stored in the output data array less than a rate at which sensor data is stored in the input data array and in response causing the first spatial resolution location identifier to stop executing and causing a second spatial resolution location identifier to start executing to identify locations of items in the retail store at a second spatial resolution that is a lower spatial resolution than the first spatial resolution based on sensor data stored in the input data array.

14. The computer of claim 13 further comprising:
when executing the first spatial resolution location identifier, the processor further executes a first correlation module that correlates two identified locations having the first spatial resolution and when executing the second spatial resolution identifier, the processor executes a second correlation module that correlates two identified locations having the second spatial resolution.

15. The computer of claim 14 wherein the first correlation module produces a first correlated value that is the data stored in the output data array.

16. The computer of claim 13 wherein the processor further executes a message reader that requests sensor messages from a message broker using a topic, parses each received sensor message to form parsed data and stores the parsed data in the input data array.

17. The computer of claim 16 wherein the message reader uses a first topic when the first spatial resolution location identifier is executing and a second topic when the second spatial resolution location identifier is executing.

18. The computer of claim 17 wherein the first topic provides sensor messages for more sensors than the second topic.

19. The computer of claim 13 wherein the performance monitor further determines that the second spatial resolution location identifier is unable to determine locations fast enough and in response, the performance monitor changes a temporal resolution of the second spatial resolution location identifier.

* * * * *